INVENTOR.
Donald Watson Bingley

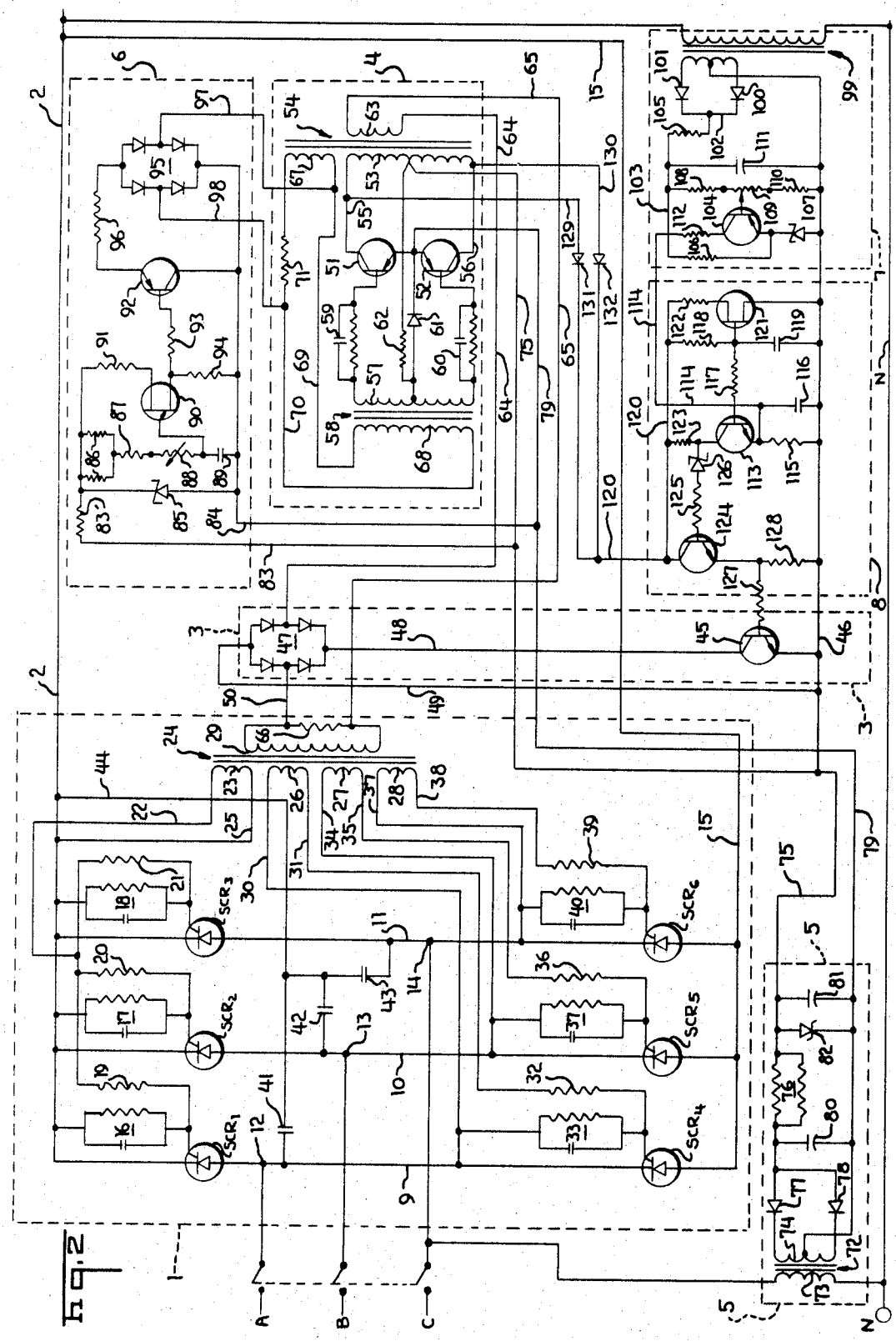

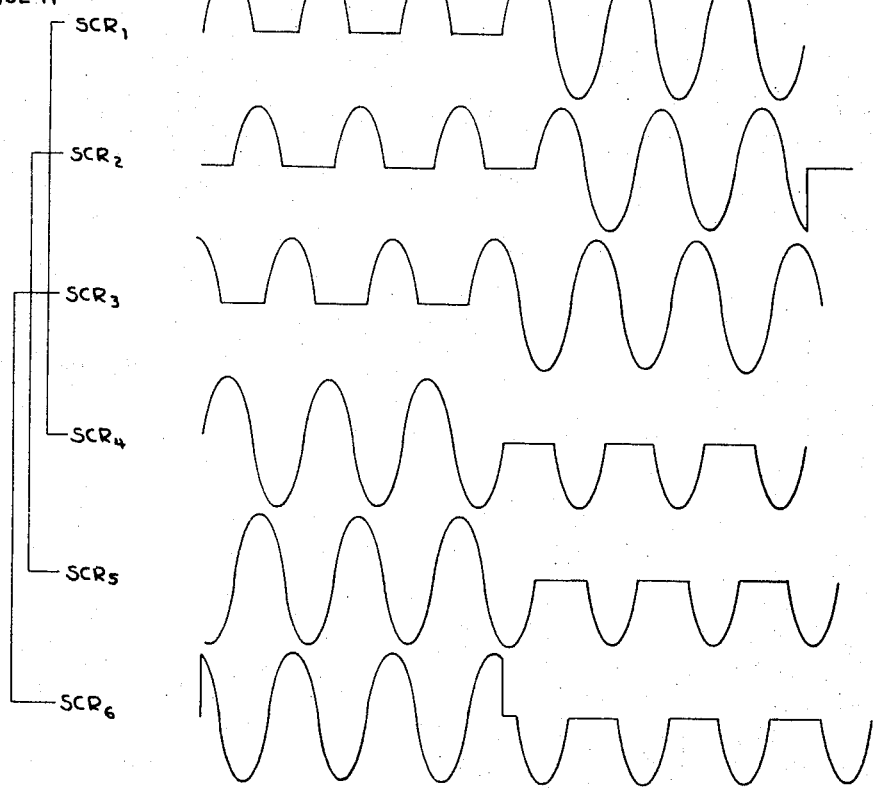

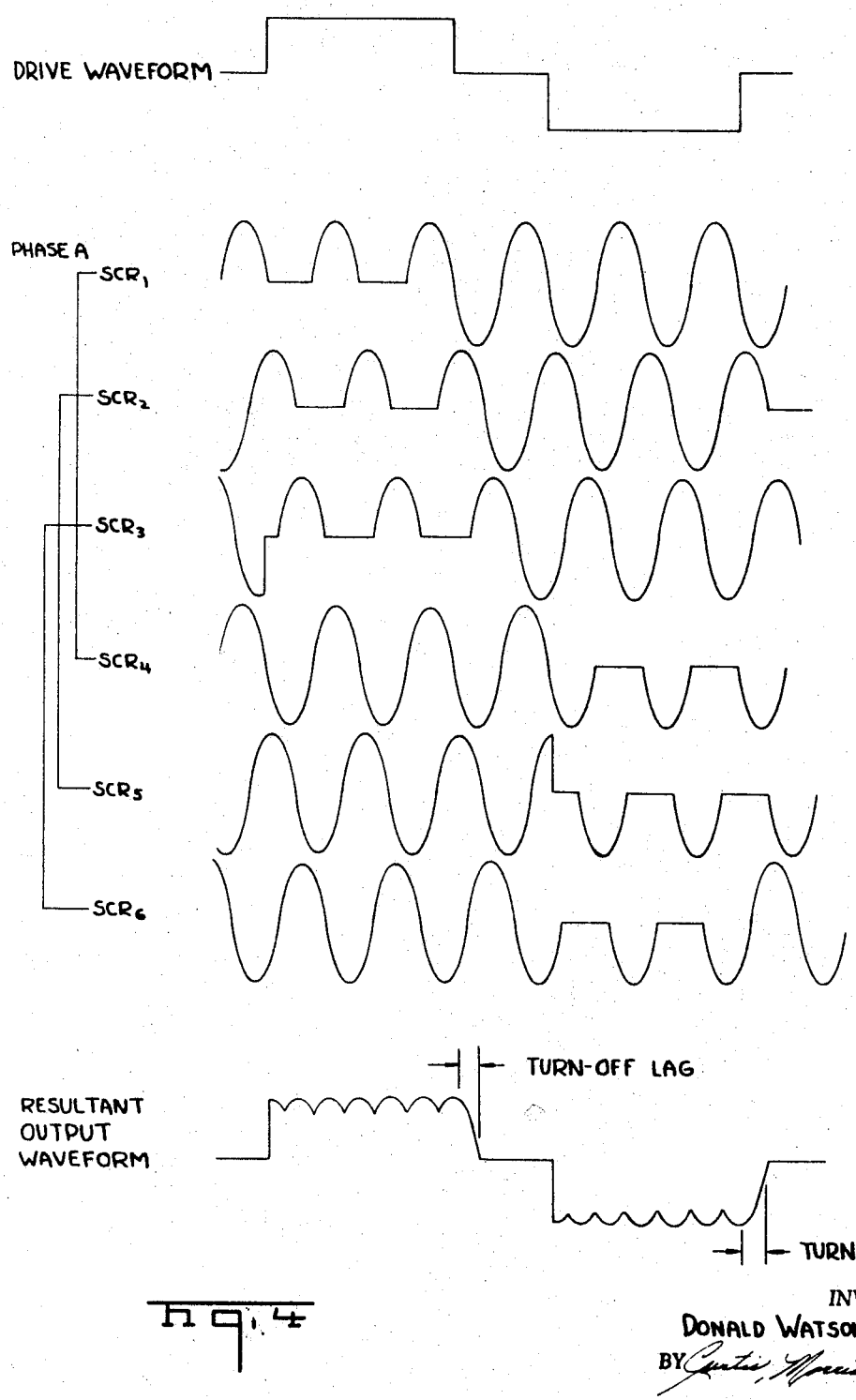

United States Patent Office 3,419,783
Patented Dec. 31, 1968

3,419,783
SYSTEM FOR SUPPLYING FREQUENCY CONTROLLED SINGLE PHASE VOLTAGE FROM VARYING POLYPHASE INPUT VOLTAGE
Donald Watson Bingley, Mechanicsburg, Pa., assignor to AMP Incorporated, Harrisburg, Pa.
Continuation of application Ser. No. 365,574, May 7, 1964. This application Sept. 14, 1967, Ser. No. 667,859
10 Claims. (Cl. 321—7)

ABSTRACT OF THE DISCLOSURE

A frequency converter system for converting polyphase input voltage to single phase output with the frequency and voltage of the single phase output voltage being predeterminately controlled independently of the input polyphase voltage.

---

This application is a continuation of patent application Ser. No. 365,574, filed on May 7, 1964 and now abandoned.

Large aircraft, helicopters and some ground vehicles utilize a primary source of electrical supply of high frequency polyphase current generally identified as four hundred cycles three phase. This source of supply cannot be used to operate conventional equipment, such as, test equipment, motors, recorders, etc., which operate on a 50–60 cycle, single phase source of supply and are carried abroad the above-mentioned conveyances. Heretofore, frequency conversion devices to convert high frequency polyphase alternating current to lower frequency single phase alternating current have been provided but these have provved to be cumbersome, nonaccurate and incapable of supplying adequate power output thereby rendering them unsatisfactory. Thus, there has been a need for a noncumbersome frequency conversion device to accurately connect high frequency polyphase alternating current to lower frequency single phase alternating current in the above-mentioned environments as well as any other.

It is, therefore, an object of the present invention to provide control circuitry of the electronic variety to convert high frequency polyphase alternating current to lower frequency single phase alternating current.

It is another object of the present invention to provide frequency conversion circuitry that is noncumbersome and produces an accurate output.

A further object of the present invention is to provide frequency conversion circuitry that is capable of handling high currents to deliver some order of power at low voltage.

An additional object of the present invention is the provision of frequency conversion circuitry which does not require power transformers.

A still further object of the present invention is the provision of frequency conversion circuitry which is independent of the input frequency.

Moreover, it is a further object of the present invention to achieve frequency conversion at high efficiency.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

In the drawings:

FIGURE 2 is a diagrammatic representation of the circuit arrangement of FIGURE 1; and FIGURES 3 and 4 are waveshape diagrams which illustrate respectively square-wave drive and quasi-square-wave drive across components in the circuit arrangement.

Figure 1:
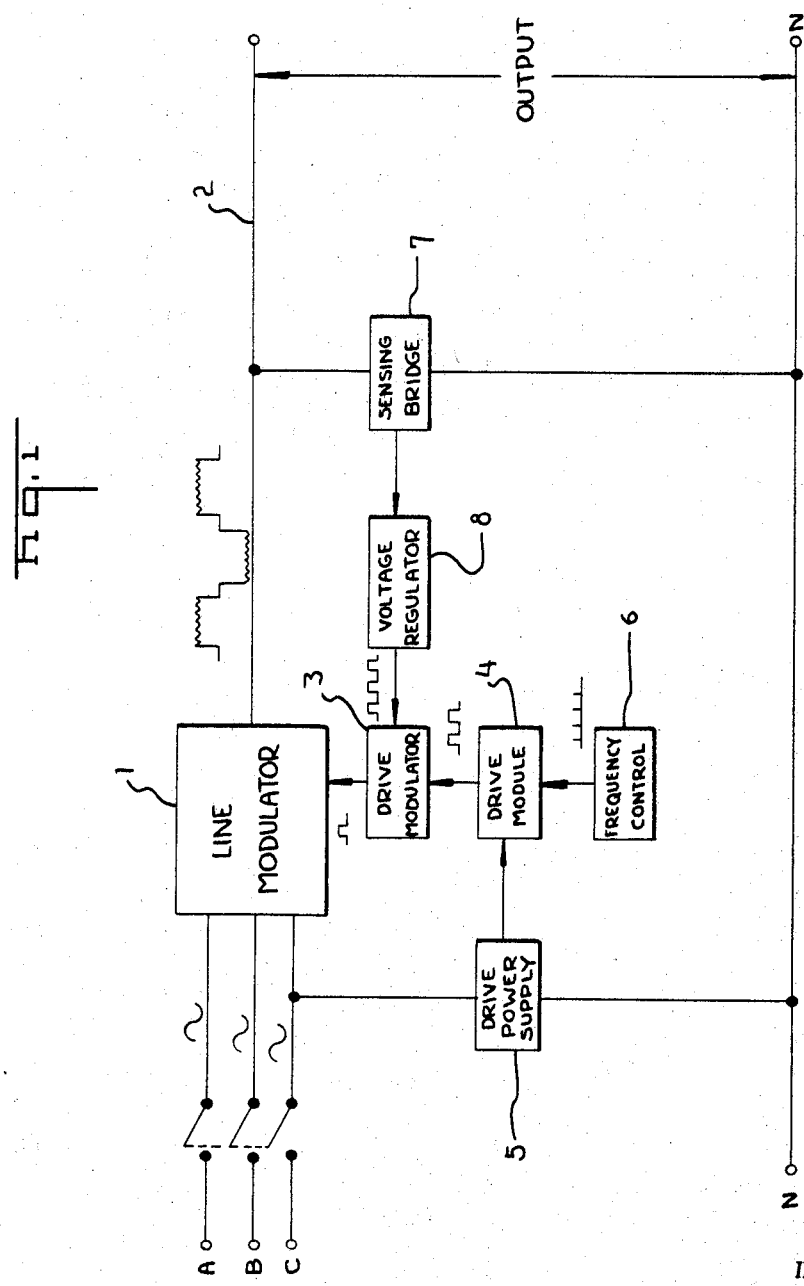
FIGURE 1 is a general block diagram of the circuit arrangement of the present invention.

Turning now to the drawings there is illustrated in FIGURE 1 a three phase in put A, B and C from a conventional power source, for example, of four hundred cycle, three phase, two hundred and eight volts. The input is connected to a line modulator circuit 1 having a single output lead 2 connected thereto.

A drive modulator circuit 3 is connected to line modulator circuit 1. Connected to drive modulator circuit 3 is a drive module cricuit 4. A drive power supply 5 is connected between phase C and a neutral lead N and to drive module circuit 4 to provide a regulated power supply thereto.

A frequency control circuit 6 is connected to drive module circuit 4 in order to control the output frequency on leads 2 and N. A sensing bridge circuit 7 is connected between leads 2 and N and to a voltage regulator circuit 8 which, in turn, is connected to drive modulator circuit 3 in order to control the output voltage on leads 2 and N.

Turning now to FIGURE 2, line modulator circuit 1 shows silicon-controlled rectifiers $SCR_1 \ldots SCR_6$. The anodes of $SCR_1$, $SCR_2$ and $SCR_3$ are, respectively, connected via leads 9, 10 and 11 to the cathodes of $SCR_4$, $SCR_5$ and $SCR_6$ thereby providing pairs of SCR's, namely, $SCR_1$ and $SCR_4$, $SCR_2$ and $SCR_5$ and $SCR_3$ and $SCR_6$. Phase A is connected to paired $SCR_1$ and $SCR_4$ at 12, phase B is connected to paired $SCR_2$ and $SCR_5$ at 13, and phase C is connected to paired $SCR_3$ and $SCR_6$ at 14.

The cathodes of $SCR_1$, $SCR_2$ and $SCR_3$ are connected to lead 2 while the anodes of $SCR_3$, $SCR_4$ and $SCR_5$ are connected to lead 2 via lead 15. $SCR_1$, $SCR_2$ and $SCR_3$, respectively, have an RC network 16, 17 and 18 connected in parallel relationship between lead 2 and the gates thereof. Resistors 19, 20 and 21 are, respectively, connected in series relationship via lead 22 between the gates of $SCR_1$, $SCR_2$ and $SCR_3$ and one side of secondary winding 23 of transformer 24. The other side of secondary winding 23 is connected via lead 25 to lead 2.

Transformer 24 contains further secondary windings 26, 27 and 28 and a primary winding 29. Lead 30 connects one side of winding 26 to lead 9 while lead 31 connects the other side of winding 26 to the gate of $SCR_4$ via resistor 32 in series relationship therebetween. A parallel RC network 33 is connected in parallel with leads 30 and 31.

Winding 27 has one side connected to lead 10 by lead 34 and the other side connected to the gate of $SCR_5$ via lead 35 through a series resistor 36. Connected in parallel with leads 34 and 35 is a parallel RC network 37.

Leads 37 and 38 connect each side of winding 28, respectively, to lead 11 and the gate of SCR₆ with lead 38 having a resistor 39 in series therein. Between leads 37 and 38, there is a parallel RC network 40.

One side of capacitors 41, 42 and 43 is, respectively, connected to leads 9, 10 and 11 while the other side thereof is connected to lead 2 via lead 44.

Drive modulator circuit 3 includes a transistor 45 having the emitter connected to a lead 46 and the collector connected to one leg of a diode bridge 47 via lead 48. Lead 49 is connected between lead 46 and another leg of bridge 47. A further leg of bridge 47 is connected to one side of winding 29 through lead 50.

Drive module or inverter circuit 4 comprises transistors 51 and 52 having their emitters connected in common while the collectors thereof are, respectively, connected to one side of primary winding 53 of transformer 54 by leads 55 and 56. The bases of transistors 51 and 52 are respectively connected to secondary winding 57 of transformer 58 via parallel RC networks 59 and 60. A diode 61 is connected to the center tap of winding 57 and emitters of transistors 51 and 52. A resistor 62 is connected between the anode side of diode 61 to the center tap of winding 53.

Secondary winding 63 of transformer 54 has one side connected to an additional leg of bridge 47 via lead 64. The other side of winding 63 is connected to the other side of winding 29 of transformer 24 through lead 65. A resistor 66 is connected across leads 50 and 65 in parallel with winding 29. Another winding 67 of transformer 54 is connected to winding 68 of transformer 58 via leads 69 and 70 with lead 70 having resistor 71 therein.

Drive power supply circuit 5 comprises a transformer 72 having its primary winding 73 connected between phase C and neutral lead N. Secondary winding 74 has one side connected to the center tap of winding 53 via lead 75. This lead includes in series relationship a parallel resistance network 76 and a diode 77. Another diode 78 has the positive side connected between network 76 and the positive side of diode 77 while the negative side is connected to the other side of winding 74. Lead 79 connects the center tap of winding 74 to the emitters of transistors 51 and 52. Capacitors 80 and 81 are connected, respectively, on each side of network 76 across leads 75 and 79 with Zener diode 82 connected across these leads between network 76 and capacitor 81. Circuit 5 supplies a rectified and filtered D.C. output of about 28 volts which is regulated by Zener diode 82.

Frequency control circuit 6 has two leads 83 and 84 connected, respectively, to leads 75 and 79. Lead 83 has resistor 83' connected in series therein. Zener diode 85 is connected across leads 83 and 84. An RC network is connected across leads 83 and 84 and includes parallel resistors 86 serially connected to resistor 87 which, in turn, is serially connected to variable resistor 88 and capacitor 89 connected in series relationship.

A unijunction transistor 90 has one base connected to lead 83 via resistor 91 while the other base is connected to the base of transistor 92 through resistor 93. The latter base is also connected to lead 84 via a resistor 94. The emitter of unijunction transistor 90 is connected to the junction between resistor 88 and capacitor 89. The emitter of transistor 92 is connected to one leg of a diode bridge 95 through resistor 96. The collector of transistor 92 is connected to lead 84 which then is connected to a second leg of bridge 95. A third leg of bridge 95 is connected to lead 69 via lead 97 and the fourth leg of this bridge is connected via lead 98 to lead 70 on the side of resistor 71 remote from winding 67.

Sensing bridge circuit 7 comprises a transformer 99 whose primary winding is connected between leads 2 and N. The secondary winding of transformer 99 has the anodes of diodes 100 and 101 connected, respectively, to each end thereof while the cathodes of the diodes are connected together via lead 102. As can be discerned, lead 46 has one end connected to the center tap of transformer 99 and the other end connected to lead 75 of drive power supply circuit 5.

Lead 103 is connected between lead 102 and the emitter of transistor 104 and has resistors 105 and 106 in series therein. The emitter is connected to lead 46 via a Zener diode 107. A series resistor network comprising resistors 108, 109 and 110 is connected across leads 103 and 46. Resistor 109 is a potentiometer and the movable contact thereof is connected to the base of transistor 104. A capacitor 111 is connected across leads 103 and 46 in parallel with the above-mentioned resistor network. The collector of transistor 104 is connected to one side of resistor 112.

Voltage regulator circuit 8 includes a transistor 113 which has the emitter thereof connected to the other side of resistor 112 via lead 114 and to lead 46 through resistor 115. A capacitor 116 is connected between leads 46 and 114.

The base of transistor 113 is connected via resistor 117 to the junction of resistor 118 and capacitor 119 which are connected in series between leads 46 and 120. The emitter of unijunction transistor 121 is also connected to the junction of resistor 118 and capacitor 119. One base of transistor 121 is connected to lead 120 via resistance 122 while the other base is connected to lead 46.

The collector of transistor 113 is connected to lead 120 via resistor 123, and the base of transistor 124 is also connected to the emitter of transistor 113 via a series network of resistor 125 and Zener diode 126. The emitter of transistor 124 is connected to the base of transistor 45 via resistor 127 and to lead 46 via resistor 128. The collector of transistor 124 is connected to lead 120. Leads 129 and 130 are connected, respectively, to leads 55 and 56 and to lead 120 via diodes 131 and 132.

OPERATION

The system is set into operation by application of three-phase four wire supply to A, B, C, and N terminals. Transformer 72 in drive power supply 5 is energized and transforms phase voltage to the lower required level, it also isolates the rest of the control system. The voltage is then rectified by means of diodes 77 and 78, the resultant D.C. is then smoothed by RC combination 80, 76 and 81 and controlled against line fluctuations by Zener diode 82. The output of the drive power supply is through wires 75 and 79. These wires feed into drive module 4 and frequency control circuit 6 via wires 83 and 84. Wires 83 and 84 are connected to resistor 83' and anode of Zener diode 85, respectively. Across Zener diode 85, there is connected an RC timing circuit comprising resistors 86, which include a resistor and thermistor in parallel giving temperature compensation, resistor 87 is a fixed value of resistance, variable resistor 88 gives frequency adjustment and capacitor 89 is the timing capacitor. Unijunction transistor 90 which in conjunction with resistors 91, 94 and RC timing circuit previously described, complete a relaxation oscillator.

A positive going pulse of voltage is produced across resistor 94, which is the output of the relaxation oscillator. This output is transferred through resistor 93 to the base of transistor 92; this triggers transistor 92 for duration of each pulse into a full conduction mode, transistor 92 otherwise being in a nonconducting high impedance state. Resistor 96 serves the function of limiting peak current through transistor 92. The secondary winding of transformer 58 supplies drive current from bridge 95 to the bases of transistors 51 and 52 through RC parallel networks 59 and 60, respectively. The resistors of networks 59 and 60 limit drive current swing and the capacitors thereof improve transient response to synchronizing pulses. Diode 61 and resistor 62 form a current biasing circuit. Secondary winding 67 of transformer 54 feeds back voltage through current limiting resistor 71 to the primary winding 68 of transformer 58. This voltage is fed back in such a manner as to be positive feedback. Hence, the system contained in drive module 4 is a self-oscillating inverter circuit. The output waveform of the inverter is a square wave.

When transistor 92 is triggered into conducting mode, it effectively puts a momentary short circuit across winding 68 for the duration of a pulse, due to its connection through bridge 95 and resistor 96. At the time of such short circuit, the inverter of drive module 4 is turned "off" and when the short is removed from winding 68, the inverter recovers, but the opposite transistor thereof to that which was conducting at time of the short conducts, and thereby the inverter is synchronized to the frequency determined by the relaxation oscillator contained in frequency control circuit 6, which was previously described.

Diodes 131 and 132 are connected to the output circuit of transistors 51 and 52 and form a center tapped bridge, lead 75 connects to the center tap of winding 53 of transformer 54 and lead 46 connects to 75 and forms a common line. The rectified waveform resulting from diodes 131 and 132 is unsmoothed and, therefore, every one-half cycle of the DC level produced thereby momentarily drops to zero prior to being supplied to circuit 8.

Voltage regulator circuit 8 is a pulse width modulation circuit which produces output pulses of DC across resistor 128, the width varying in accordance to error signal command fed from sensing bridge circuit 7, which adjusts for line and load changes of the output of the whole system.

The pulse width varies from full width, corresponding to one-half cycle time of output frequency, to a minimum value, dictated by output time and load conditions. The pulses occur once every one-half cycle of the output frequency. Resistors 122, 118, unijunction transistor 121 and capacitor 119, form a sawtooth voltage producing circuit, the output of which is taken across capacitor 119. The sawtooth voltage forming circuit is synchronized every one-half cycle of the output frequency by the fact that the voltage supply to circuit 8 momentarily drops to zero every one-half cycle of output frequency as previously described. The output of the voltage forming circuit is fed through resistor 117 to the base of transistor 113, the emitter of this transistor is connected to bias resistor and capacitor 115 and 116, respectively. An error signal from circuit 7 raises and lowers the bias voltage level, and hence, the voltage level of the base of transistor 113. The base of transistor 113, therefore, traverses the sawtooth waveform drive, and, hence, this transistor conducts for different periods of time depending on bias level. The voltage across resistor 123 consequently will be a variable pulse form, maximum when transistor 113 is conducting and minimum when this transistor is in an "off biased" state. The Zener breakover voltage is achieved when transistor 113 is in the "off biased" state and, hence, current flows through Zener 126 and resistor 125 and drives transistor 124 into conducting state, and consequently for this interval, a voltage is produced across resistor 128 which is the output of voltage regulator circuit 8.

Sensing bridge circuit 7 samples the output voltage of the system, through a sensing transformer 99 which achieves isolation. It also steps down to a desired low level. The sample output voltage is rectified by means of rectifiers 101 and 100 in the form of a center tapped bridge. The resultant DC signal is smoothed by RC combination 105, 111. When DC level across capacitor 111 changes due to output line changes, a differential of voltage occurs between the emitter and base of transistor 104 and this differential is amplified by the gain of transistor 104, the amplified error signal being fed through resistor 112, to the emitter of transistor 113 in circuit 8. The gain of transistor 104 is controlled by means of potentiometer 109.

The output voltage of regulator circuit 8 is fed through resistor 127 to the base of transistor 45. When pulses from voltage regulator circuit 8 drives transistor 45 into conduction mode, then bridge 47 is able to conduct AC current when transistor 45 is in the "off biased" high impedance state, then rectifier bridge 47 does not allow AC to flow through it. Hence, the square wave from circuit 4 via leads 64 and 65 is modulated by circuit 3 which comprises rectifier bridge 47 and transistor 45 previously described and the resultant quasi-square waveform is fed to winding 29 of transformer 24 in line modulator circuit 1. When the drive modulator circuit 3 switches to "off" state, the current flow into winding 29 of transformer 24 is interrupted, and, due to the inductive nature of the winding, it requires an alternative path for current to flow, namely, through resistor 66. This keeps the zero level of the quasi-square wave free of inductive spikes. Secondary windings 26, 27 and 28 are the same phase and simultaneously trigger $SCR_4$, $SCR_5$ and $SCR_6$ through their respective RC networks and series resistances 33, 32; 37, 36; and 40, 39. The three separate windings are required for AC isolation, as the $SCR_4$ through $SCR_6$ cathodes are not common. RC networks 33, 37 and 40 suppress spurious transients at the gates of their respective SCR's and, hence, prevent random triggering thereof. Resistors 32, 36 and 39 limit current to the gates of the SCR's and so limit excessive power dissipation therein. When silicon-control rectifiers $SCR_4$ through $SCR_6$ are triggered, they conduct on the negative half cycles of phase input voltages A, B and C, respectively, the return conduction path being through neutral line N.

Secondary winding 23 of transformer 24 is connected in opposite phase to windings 26, 27 and 28. One side of winding 23 connects to the cathodes of $SCR_1$ through $SCR_3$ which are commoned via lead 25. RC networks and concomitant resistances 16, 19; 17, 20 and 18, 21 serve the same function as RC networks and accompanying resistances connected to $SCR_4$ through $SCR_6$, previously described. $SCR_1$ through $SCR_3$ conduct on the positive one-half cycles of phase input voltages A, B and C, respectively, the return conduction path of each being through neutral line N. The quasi-square wave drive serves the dual function of preventing a short circuit condition, when switching from one set of SCR's to the other, and, also by variation of dwell time controlling the energy content of the output waveform, hence, RMS voltage.

Capacitors 42 and 43 serve the function of limiting the rate of applied voltage to the SCR's and so prevent failure and also possible spurious triggering.

A further description of circuit operation will be with reference to the voltage waveforms impressed across silicon-controlled rectifiers, $SCR_1$ through $SCR_6$, the voltage waveforms being shown in FIGURES 3 and 4. The voltage waveforms shown in FIGURE 3 are drive voltage waveforms, i.e., the waveform used to trigger $SCR_1$ through $SCR_6$, the voltage waveforms impressed across $SCR_1$ through $SCR_6$, and the resultant voltage output waveform that would be seen between neutral line N and line 2 shown in FIGURE 1.

The drive to the silicon-controlled rectifiers is so connected, as previously described, that on each one-half cycle of the drive waveform, one group of SCR's are triggered such that they conduct on the positive one-half cycles of the waveform on each input of phases A, B and C, this group being namely $SCR_1$ through $SCR_3$. During this time, $SCR_4$ through $SCR_5$, are non-conducting because their gates are negatively biased.

On the next one-half cycle of the drive waveform, $SCR_4$ through $SCR_6$ group of silicon-controlled rectifiers is triggered, and they conduct on the negative one-half cycle of each of the input phase waveforms A, B and C; the resultant output waveforms will be, as shown, a true square wave. However, with square wave drive, due to the natural operation of a silicon-controlled rectifier, i.e., once in conductive state, it will not revert to a blocking state until current being conducted through the device has been reduced below the "holding" current of that device. It is evident that with a true square wave drive waveform, a short circuit will occur between phases in FIGURE 3. This occurs between SCR₂ and SCR₆, both being in conduction mode at the same time. This can result in either failure of a silicon-controlled rectifier or failure of three-phase supply unless current limiting means is present, and current limiting means requires either higher power consumption and/or is bulky.

In FIGURE 4, the drive waveform is a quasi-square wave. This type of waveform enables all silicon-controlled rectifiers to achieve a blocking state, i.e., when the zero portion of the drive waveform is reached and when the next group of silicon-controlled rectifiers is triggered, there is no possibility of a short circuit condition occurring, and this is achieved without bulky and/or dissipative devices. The "turn off lag" is indicated on the resultant output waveform in FIGURE 4 and this is the time after drive is removed from each silicon-controlled rectifier that it takes the silicon-controlled rectifier to assume its blocking anode. This happens when the polarity of the input waveform to the silicon-controlled rectifier reverses.

As can be discerned, the output waveform is not a true sinusoidal waveform and such may readily be obtained by providing filter means in the output circuit of the frequency conversion system.

Drive modulator circuit 3 may operate independently of input frequency and may be independently regulated. The input frequency can be of any frequency so long as it is higher than output frequency, but when input and output frequencies approach each other, control is not as effective. For manual control, sensing bridge circuit 7 may be replaced by a manually adjustable DC bias.

Frequency control circuit 6 is also unique for the following reasons: it requires a minimum input, e.g., one milliwatt, and can control up to about three hundred watts representing a power gain of three hundred thousand without the use of numerous stages of amplification; if synchronizing signal input is shorted or the signal is lost, catastrophic failure will not result because basically this circuit is a free-running oscillator, and if it does not cut off, accuracy will be that of the free-running oscillator and thereby not as accurate; the circuit operates by switching off inverter circuit 4 to synchronize it and is, therefore, inherently fail-safe. This frequency control circuit may be used in conjunction with Jensen or Royer type inversion circuitry.

Modifying electric power from one frequency to another, this frequency changer may be utilized by a multitude of communication systems, transportation facilities and by virtually any industry requiring a change in electric power from one frequency to another. One important feature of this frequency converter is that the ratio of power to weight is excellent and requires no moving parts. Resistance to shock and vibration is another important feature which is accomplished through rugged construction.

It will, therefore, be appreciated that the aforementioned and other desirable objects have been achieved; however, it should be emphasized that the particular embodiment of the invention, which is shown and described herein, is intended as merely illustrative and not as restrictive of the invention.

I claim:

1. In an electrical circuit of the kind described, means for supplying a three-phase source of alternating voltage, bistable circuit means connected to each phase of said three-phase source, means connected to said bistable circuit means to actuate same in sequence for a predetermined number of times with voltages of one polarity beginning with one-phase voltage and in phase sequence including the remaining phase voltages and with voltages of the opposite polarity beginning with said one-phase voltage and in phase sequence including the remaining phase voltages, means providing a predetermined time delay between the voltages of the one polarity and the voltages of the opposite polarity, output means connected to said bistable means to provide a single-phase alternating current output voltage, means connected between said output means and said actuating means to control the output thereof to said bisable means and frequency control means included in said control means to control the frequency of said output means independent of the frequency of the three-phase source of alternating voltage.

2. In an electrical circuit according to claim 1 wherein said control means includes voltage regulator means to regulate the voltage to said bistable means.

3. A frequency converter system comprising means for supplying a multiphase source of alternating voltage, modulator means connected to said supplying means to modulate the multiphase source of alternating voltage in sequence for a predetermined number of times with voltages of one polarity beginning with one-phase voltage and in phase sequence including the remaining phase voltages and with voltages of the opposite polarity beginning with said one-phase voltage and in phase sequence including the remaining phase voltages, means providing a time delay between the voltages of the one polarity and the voltages of the opposite polarity, drive means connected to said modulator means to provide a waveform thereto for modulation thereby, output circuit means connected to said modulator means to provide a single-phase alternating output voltage, means connected between said output circuit means and said modulator means to adjust the waveform thereto, and means included in said adjusting means to control the frequency of said output means independent of the frequency of the multiphase source of alternating voltage.

4. A frequency converter system according to claim 3 wherein said modulator means includes solid state unidirectional conducting means connected to each phase of the multiphase source of alternating voltage.

5. A frequency converter system according to claim 3 wherein said adjusting means includes voltage regulator means to regulate the voltage to said modulator means.

6. A frequency converter system for converting polyphase input voltage to single-phase output voltage comprising polyphase input means, controlled-current conducting means connected to each phase of said polyphase input means, drive circuit means connected to said controlled-current conducting means to drive same to conduction in a predetermined sequence, delay means connected to said controlled-current conducting means to prevent short-circuiting thereof, output circuit means connected to said controlled-current conducting means on which the single-phase voltage is transmitted, feed-back means connected between said output means and said drive circuit means to regulate the voltage of said drive circuit means, and frequency control circuit means connected to said drive circuit means to control the frequency thereof independent of the frequency of said input means.

7. Frequency circuit control means comprising input means, serial resistance and capacitor means connected across said input means, solid state means having legs connected in shunt with said resistance and capacitance means and another leg connected therebetween, impedance means connecting said solid state means with another solid state means, and rectifier bridge means connected in shunt with said other solid state means and with a utilization circuit to provide an output signal to said utilizaion circuit means at a frequency independent of the frequency of said input means.

8. A device as defined in claim 7 wherein said serial resistance comprises a resistor and thermistor in parallel and a resistor in series therewith.

9. A device as defined in claim 7 wherein said other solid state means comprises a transistor.

10. A device as defined in claim 9 wherein said utilization circuit comprises an inductor.

References Cited

UNITED STATES PATENTS

| | | | |
|---|---|---|---|
| 3,146,392 | 8/1964 | Sylvan | 323—22 |
| 3,300,585 | 1/1967 | Reedyk et al. | |
| 3,334,243 | 8/1967 | Cooper. | |

OTHER REFERENCES

G.E. Controlled Rectifier Manual, 2nd ed., Dec. 29, 1961, p. 4–6 inclusive; copy in Group 210.

JOHN F. COUCH, *Primary Examiner.*

G. GOLDBERG, *Assistant Examiner.*

U.S. Cl. X.R.

307—252, 260, 269; 321—61, 69: 323—22